US009963002B2

(12) United States Patent
Peine

(10) Patent No.: US 9,963,002 B2
(45) Date of Patent: May 8, 2018

(54) PRESSURE MODULE, TRANSCEIVER MODULE, CONTROL MODULE, METHODS AND COMPUTER PROGRAMS FOR PROVIDING INFORMATION RELATED TO A TIRE PRESSURE

(71) Applicant: Infineon Technologies AG, Neubiberg (DE)

(72) Inventor: André Peine, München (DE)

(73) Assignee: Infineon Technologies AG, Neubiberg (DE)

( * ) Notice: Subject to any disclaimer, the term of this patent is extended or adjusted under 35 U.S.C. 154(b) by 192 days.

(21) Appl. No.: 14/132,582

(22) Filed: Dec. 18, 2013

(65) Prior Publication Data

US 2015/0165835 A1 Jun. 18, 2015

(51) Int. Cl.
*B60C 23/00* (2006.01)
*B60C 23/02* (2006.01)
(Continued)

(52) U.S. Cl.
CPC ...... *B60C 23/0416* (2013.01); *B60C 23/0454* (2013.01); *B60C 23/0459* (2013.01); *B60C 23/0488* (2013.01)

(58) Field of Classification Search
CPC ............ B60C 23/0433; B60C 23/0408; B60C 23/0416; B60C 23/0444; B60C 23/041;
(Continued)

(56) References Cited

U.S. PATENT DOCUMENTS 4,186,377 A * 1/1980 Barabino ................. 340/446
6,486,773 B1 * 11/2002 Bailie ................. B60C 23/0408
340/442
(Continued)

FOREIGN PATENT DOCUMENTS

CN 103029657 A 4/2013
DE 102009038100 A1 2/2011
(Continued)

OTHER PUBLICATIONS

Lourens, Ruan et al., *Tire Pressure Monitoring (TPM) System*, Microchip AN238, © 2009, pp. DS00238C-p.1-DS00238C-p. 12.
(Continued)

*Primary Examiner* — Emily C Terrell
(74) *Attorney, Agent, or Firm* — Schiff Hardin LLP

(57) ABSTRACT

Embodiments may provide a pressure module, a transceiver module, a control module, methods and computer programs for providing information related to a tire pressure. The pressure module is configured to provide information related to a pressure of a tire in a vehicle, comprises a pressure determiner configured to determine the information related to the pressure of the tire, and further comprises a transceiver configured to wirelessly receive information related to an instruction to provide the information related to the pressure of the tire and to wirelessly transmit the information related to the tire pressure. The transceiver is configured to wirelessly transmit and receive in the same frequency band. The transceiver module is configured to wirelessly transmit information related to an instruction to provide information related to a pressure of a tire to the tire pressure module and to wirelessly receive the information related to the tire pressure.

17 Claims, 7 Drawing Sheets

(51) Int. Cl.
*B60R 25/10* (2013.01)
*B60C 23/04* (2006.01)

(58) Field of Classification Search
CPC ............ B60C 23/0413; B60C 23/0449; B60C 23/0464; B60C 23/0494; B60C 11/24; B60C 11/246; B60C 19/00; B60C 23/007; B60C 23/008; B60C 23/009; B60C 23/0428; B60C 23/043
USPC ............................ 340/447, 426.33, 442, 445
See application file for complete search history.

(56) References Cited

U.S. PATENT DOCUMENTS

| | | | | |
|---|---|---|---|---|
| 7,310,593 | B2* | 12/2007 | Hammerschmidt | B60C 23/0474 |
| | | | | 702/189 |
| 7,825,781 | B2* | 11/2010 | Matsumura | ............... 340/426.33 |
| 9,162,540 | B2* | 10/2015 | Shin | ........................ B60C 23/02 |
| 2001/0008083 | A1* | 7/2001 | Brown | ................ B60C 23/0408 |
| | | | | 73/146 |
| 2002/0027347 | A1 | 3/2002 | Fujita | |
| 2003/0122660 | A1* | 7/2003 | Kachouh | ............. B60C 23/0464 |
| | | | | 340/442 |
| 2006/0001535 | A1 | 1/2006 | Hafele | |
| 2006/0158324 | A1* | 7/2006 | Kramer | ......................... 340/447 |
| 2007/0186635 | A1* | 8/2007 | Fujioka | ............... B60C 23/0444 |
| | | | | 73/146 |
| 2007/1175268 | | 8/2007 | Honda | |
| 2007/0205913 | A1* | 9/2007 | Okada | ................. B60C 23/0433 |
| | | | | 340/13.24 |
| 2007/0222570 | A1* | 9/2007 | Ou | ....................... B60C 23/0444 |
| | | | | 340/447 |
| 2008/0055042 | A1* | 3/2008 | Okada | ................. B60R 25/2072 |
| | | | | 340/5.61 |
| 2010/0328059 | A1* | 12/2010 | Kanenari | ............ B60C 23/0408 |
| | | | | 340/447 |
| 2011/0254678 | A1* | 10/2011 | Sun et al. | ..................... 340/447 |
| 2012/0128057 | A1 | 5/2012 | Daecke et al. | |
| 2015/0229469 | A1 | 8/2015 | Hainz | |

FOREIGN PATENT DOCUMENTS

| | | |
|---|---|---|
| JP | S55-25182 A | 2/1980 |
| JP | 2002/067846 A | 3/2002 |
| JP | 2006/250663 A | 9/2006 |
| JP | 2007/078626 A | 3/2007 |
| JP | 2007/198305 A | 8/2007 |
| JP | 2012/114908 A | 6/2012 |

OTHER PUBLICATIONS

Freescale SemiConductor, *MPXY8300 Tire Pressure Monitoring System*, 2 pages, as available at http://www.freescale.com/files/sensors/doc/fact_sheet/MPXY8300TPMSFS.pdf on Dec. 13, 2013.
Office Action dated Jan. 25, 2016 for Japanese Patent Application No. 2015-025187.

* cited by examiner

PRESSURE MODULE, TRANSCEIVER MODULE, CONTROL MODULE, METHODS AND COMPUTER PROGRAMS FOR PROVIDING INFORMATION RELATED TO A TIRE PRESSURE

BACKGROUND OF THE INVENTION

Embodiments relate to a pressure module, a transceiver module, a control module, methods and computer programs for providing information related to a tire pressure of a wheel of a vehicle.

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component in the vehicle. Such a configuration can enable the system to report or signal pressure losses of the tires to the driver. Some known TPMS provide localization information on the tire or wheel on top of pressure information so as to indicate to a driver of a vehicle the position of a wheel having a pressure loss. Examples are indications on whether a pressure loss of a tire of a wheel of a car is on the Front Left (FL) tire, the Front Right (FR) tire, the Rear Left (RL) tire, and/or the Rear Right (RR) tire. After replacement of a wheel or tire, assignment or re-assignment of the sensor signals to the positions on the vehicle may be necessary. Such assignment can be carried out manually, for example, by using a Low-Frequency (LF) initializer, which is used to initialize each individual sensor upon indication from a system receiver. The initialization can be affected by sequentially activating an LF-initiator in the proximity of the respective sensor and receiving an according response with a unique identification from the sensor.

Some known TPMS systems utilize multiple LF-initializers, e.g. in terms of transmitter coils or inductors, for initialization of each individual sensor or wheel, for example, they can be mounted in the wheel housing of each wheel. The number of involved LF-initializers may render such an approach uneconomic. For example, an identification of the sensor may then be assigned to an initialized position on the vehicle, which assumes that the according initialization procedure is carried out correctly after a change of tires, replacement of a wheel, etc. Other concepts make use of different reception levels of the LF-radio signals using transmitter coils at different locations asymmetric to the wheels, e.g. one in the front and one in the back. These concepts may be extensive and unsuitable for after-market installation. Further concepts make use of the varying reception power of the RF-signals transmitted by the sensors. The reception power of such an RF-signal can be measured and the different locations may be distinguished by the different reception levels, e.g. evoked by different distances of the wheels. The larger the distance between a wheel and the corresponding receiver the lower the reception power. In some cars a distinction between the signals from the front and the signals from the back may be possible, as the receiver is located at an asymmetric position, e.g. close to a rear axis, a distinction between signals from the left and right may be rather difficult. Some concepts may use a set of acceleration sensors, which are installed in orthogonal manner in each wheel to determine the rotational direction of the wheels to distinguish left and right wheels. This concept may suffer from the complex propagation paths of the wireless signals, which may render an assignment of a reception level of a signal to a certain wheel difficult.

Another concept uses ABS (Anti-lock Braking System) signals to determine rotational frequencies of the wheels and relate or correlate them to rotational frequencies determined based on TPMS signals, which may make use of acceleration sensors determining the acceleration changes as the sensor rotates with the wheel in gravitation. This concept, however, may be difficult to establish if the signals of the ABS system cannot be made available. This may render the concept unsuitable for after-market systems.

Furthermore, the size of a TPMS module may be considered contributor to the overall cost and efficiency of such a module. The size of a pressure module may be determined by a battery or energy provider, which is used to power the sensor and the cost of such an energy provider further influences the overall cost and efficiency of the module. In addition there may be certain boundary conditions with respect to the lifetime of such a pressure module, its energy provider, respectively. For example, it an automotive application an expected lifetime or operational time of a pressure module may range at about seven to ten years.

SUMMARY

Embodiments make use of a communication between a pressure module and a transceiver module in the same frequency band. The pressure module may then comprise a transceiver which allows bidirectional communication with a transceiver module, such that instructional information can be received at the pressure module from the transceiver module. In other words, the pressure module may then provide information related to a pressure of a tire on demand, wherein such demand may be generated by or through the transceiver module using accordingly adapted instructional information.

Embodiments provide a pressure module, which is configured to provide information related to a pressure of a tire in a vehicle. The pressure module comprises a pressure determiner configured to determine the information related to the pressure of the tire. The pressure module further comprises a transceiver, which is configured to wirelessly receive information related to an instruction to provide the information related to the pressure of the tire, and to wirelessly transmit the information related to the tire pressure. Wireless transmission and reception is carried out in the same frequency band.

Embodiments also provide a transceiver module configured to communicate with a tire pressure module. The transceiver module comprises a transceiver configured to wirelessly transmit information related to an instruction to provide information related to a pressure of a tire to the tire pressure module. The transceiver is further configured to wirelessly receive the information related to the tire pressure from the tire pressure module. Accordingly, the transceiver is configured to wirelessly transmit and receive in the same frequency band.

Furthermore, embodiments provide a control module configured to determine information related to a pressure of a tire of a vehicle. The control module comprises an interface configured to communicate with a transceiver module. The control module further comprises a controller configured to determine information related to a state of movement of the vehicle and to communicate information related to an instruction to determine the information related to the pressure of the tire based on the information related to the state of movement of the vehicle.

Embodiments may enable a determination of tire pressure information based on a state of movement of the vehicle, e.g. in a state where a pressure measurement may be expected to be reliable or valid. Embodiments may reduce a number of unreliable pressure measurements and may therewith enhance a power efficiency of a tire pressure module. Embodiments may enhance the lifetime or operational time of a battery or an energy provider of a pressure module. From another perspective embodiments may allow for smaller batteries in a pressure module while still maintaining a long lifetime or operational time. Embodiments may consequently allow manufacturing of more cost effective or efficient pressure modules.

In embodiments, the pressure module and the transceiver module may wirelessly communicate in a frequency band, which is a radio frequency band and/or lies above a carrier frequency of 100 MHz. In other words, embodiments may use frequencies above LF frequencies to enable bidirectional communication between the pressure module and the transceiver module. Embodiments may take advantage of better propagation and more efficient transceiver implementations at radio frequencies and may therefore enable a reduction in a number of transceiver modules operated in a vehicle in order to monitor a pressure of all tires of the vehicle. In some embodiments a single transceiver module may be enough to communicate with all pressure modules of the vehicle.

In some embodiments, the transceivers of one or more pressure modules and the transceiver module may be configured to wirelessly transmit and receive on different frequency carriers of the same frequency band. Embodiments may enable a frequency division duplex operation in the same frequency band. In some embodiments the transceivers of the one or more pressure modules and the transceiver module may be configured to wirelessly transmit and receive on the same frequency carrier. Some embodiments may enable a time division operation in the same frequency band. Embodiments may hence efficient bidirectional communication in the same frequency band.

In further embodiments the pressure module may further comprise a controller, which is configured to control the pressure determiner and the transceiver. The controller may be further operable to operate the pressure determiner and/or the transceiver in an operating mode and in a sleeping mode, wherein an energy consumption of the pressure determiner and/or the transceiver is lower in the sleeping mode than in the operating mode. Embodiments may provide a pressure module, which may be operated in a sleeping, stand-by, or a dormant mode, such that energy may be saved in the sleeping mode. Embodiments may provide an energy efficient pressure module. In some embodiments the controller may be configured to transfer the pressure determiner from sleeping mode to operating mode after the transceiver has wirelessly received the information related to the instruction to provide information related to the pressure of the tire. The controller may be further configured to transfer the pressure determiner into the sleeping mode after the information related to the pressure of the tire has been determined, and/or to transfer the transceiver into the sleeping mode after the information related to the pressure of the tire has been transmitted. Hence, the pressure module may be operated in an energy efficient sleeping mode and operated in operational mode to determine and transmit information related to the tire pressure before being returned to sleeping mode. Embodiments may hence provide an efficient operating mode for a pressure module.

In some embodiments the controller may be configured to transfer the pressure determiner and/or the transceiver between sleeping mode to operating mode alternately based on a wake up cycle. Embodiments may therewith provide a predefined or known time scale or schedule during which the pressure module can be instructed. In further embodiments the controller may be configured to base the wake up cycle on information related to a state of movement of the tire. Hence, the wake up cycle may be changed in different states of movements of the vehicle. For example, if the state of movement indicates that the vehicle has been parked or switched off, the wake up cycle may be longer than when the state of movement indicates the vehicle is operated or the wheels are in motion. During such operation a short duration of a stopping interval may indicate an advantageous state of movement for pressure determination. Such operation may further contribute to the power efficiency of the pressure module. The pressure module may further comprise a sensor configured to determine the information related to the state of movement of the tire. Such a sensor may enable to determine efficient wake-up interval or event configurations.

In some embodiments the transceiver module may further comprise an interface, which is configured to communicate with a control module. The interface may be configured to receive the information related to the instruction to provide the information related to the tire pressure from the control module. The interface may be further configured to provide the information related to the tire pressure to the control module. Embodiments may enable efficient control of the transceiver module, e.g. as part of a control unit of a vehicle.

The transceiver may be configured to wirelessly transmit a trigger signal as information related to the instruction. Embodiments may enable a simple instructional signal in terms of a trigger signal. The transceiver may be configured to transmit the trigger signal repetitively for a predefined time period, which is based on a wake up cycle of the tire pressure module. Repetitive transmission of the trigger signal may contribute to an efficient operation of the pressure signal in some embodiments, as repetitive transmission may allow for longer wake up cycles.

In some embodiments the controller of the control module may be configured to determine a standstill or a situation of low tire pressure variance of the vehicle based on the information related to the state of movement of the vehicle. The controller may be further configured to communicate the information related to the instruction when the standstill or the situation of low tire pressure variance of the vehicle is determined. Hence, the controller may take advantage of situations in which higher quality pressure measurements are to be expected and may therewith reduce an overall number of measurements necessary to obtain pressure information with a certain reliability. The controller may be configured to determine a cornering or circular movement of the vehicle based on the information related to the state of movement of the vehicle. The controller may be further configured to communicate the information related to the instruction when the cornering or circular driving of the vehicle is determined. In other words, the controller may as well take advantage of a situation, in which efficient localization of the pressure module is possible, e.g. using correlation of the signals from one or more pressure module and signals indicative for the state of movement of the vehicle, for example, signals from a steering unit, an ABS unit, a navigation system, acceleration sensors, etc.

The controller may be configured to locate a position of a wheel on the vehicle based on the information related to the tire pressure and the information related to the state of movement of the vehicle. Hence, the controller may locate a pressure module in terms of a tire or wheel a pressure module is mounted to and further determine pressure information of said tire or wheel. Embodiments may therewith allow efficient determination of pressure information and localization of a pressure module. The controller may be configured to locate the position of the wheel of the vehicle based on information related to the tire pressure obtained when the information related to the state of movement of the vehicle indicates a cornering or circular driving of the vehicle. Embodiments may determine a favorable situation for locating a position of a wheel and then trigger such a localization procedure. Embodiments may reduce a number of measurements necessary to carry out such localization by using measurements taken in favorable situations based on the state of movement of the vehicle.

In some embodiments the controller may be configured to locate the position of the wheel of the vehicle once between a beginning and an end of a ride of the vehicle. Embodiments may allow an operational mode in which such localization is carried out once per ride of the vehicle. The controller may be configured to obtain the information related to the state of movement of the vehicle from a navigation system of the vehicle, based on information related to a steering angle of the vehicle, or based on information related to rotational frequencies of one or more wheels of the vehicle. Embodiments may enable efficient determination of information related to the state of movement of the vehicle.

Embodiments further provide a method for providing information related to a pressure of a tire in a vehicle. The method comprises wirelessly receiving information related to an instruction to provide the information related to the pressure of the tire in a frequency band. The method further comprises determining the information related to the pressure of the tire. The method further comprises wirelessly transmitting the information related to the tire pressure in the frequency band.

Embodiments further provide a method for communicating with a tire pressure module. The method further comprises wirelessly transmitting information related to an instruction to provide information related to a pressure of a tire to the tire pressure module in a frequency band. The method further comprises wirelessly receiving the information related to the tire pressure from the tire pressure module in the frequency band.

Embodiments further provide a method for determining information related to a pressure of a tire of a vehicle. The method comprises determining information related to a state of movement of the vehicle. The method further comprises communicating information related to an instruction to determine the information related to the pressure of the tire to a transceiver module based on the information related to the state of movement of the vehicle.

Embodiments further provide one or more computer programs having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Embodiments further provide a system comprising embodiments of the above described pressure module, transceiver module and control module. Embodiments may also provide a vehicle comprising such a system.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION OF THE INVENTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
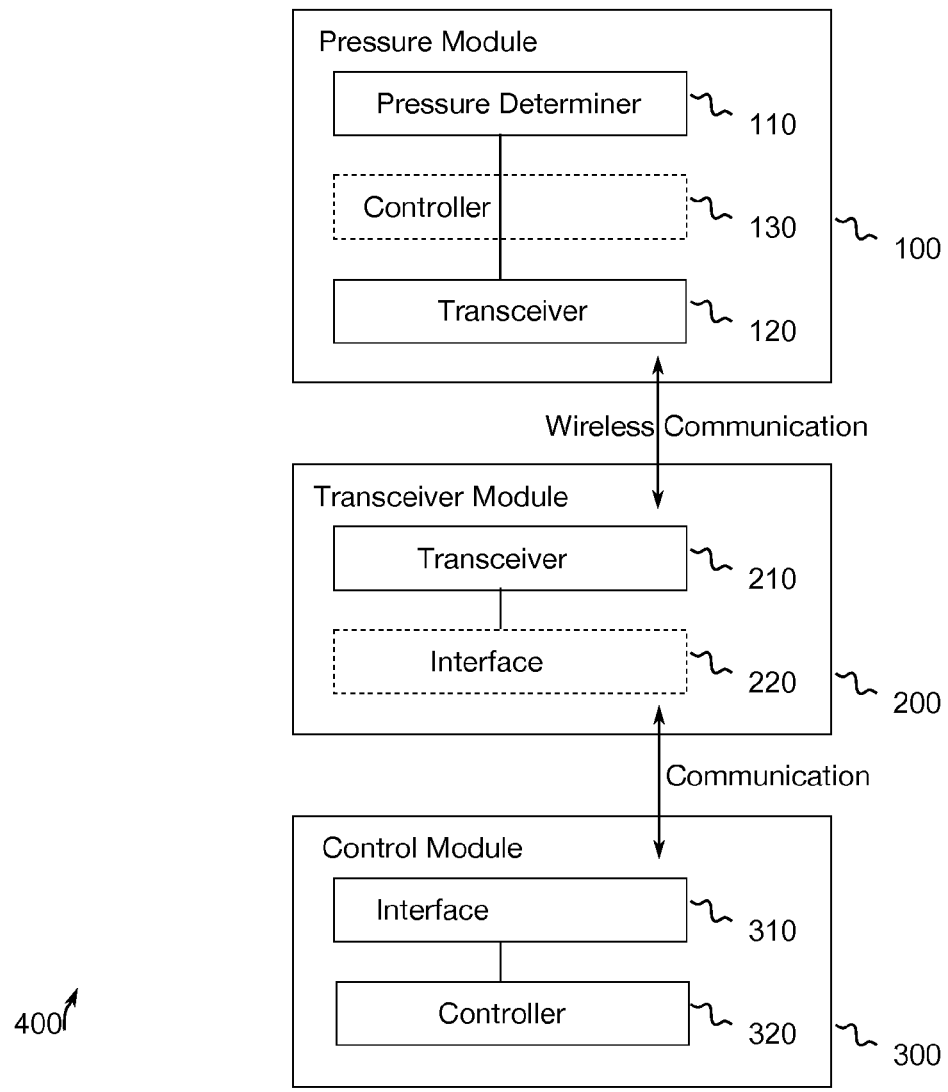
FIG. 1 shows an embodiment of a system for determining information related to a tire pressure, with embodiments of a pressure module, a transceiver module and a control module.

FIG. 1 illustrates an embodiment of a system 400 for determining information related to a tire pressure. The system 400 comprises an embodiment of a pressure module 100, an embodiment of a transceiver module 200, and an embodiment of a control module 300.

The embodiment of the pressure module 100 is configured to provide information related to a pressure of a tire in a vehicle. The pressure module 100 comprises a pressure determiner 110, which is configured to determine the information related to the pressure of the tire. The pressure determiner 110 may correspond to one or more pressure sensors, one or more pressure detectors, one or more pressure units, etc. The pressure determiner 100 may be configured to determine any signal or information, which may be analog or digital, related to the pressure of its surrounding, for example of a tire, when the pressure determiner 110 is mounted or coupled thereto.

The pressure determiner 110 is coupled to a transceiver 120. The transceiver 120 is configured to wirelessly receive information related to an instruction to provide the information related to the pressure of the tire. The transceiver 120 is further configured to wirelessly transmit the information related to the tire pressure. The transceiver 120 is configured to wirelessly transmit and receive in the same frequency band. The transceiver 120 may be implemented as one or more modules, devices, or units comprising transceiver components such as transmitter and receiver components. Such components may include one or more components of the group of one or more transmit and/or receive antennas, one or more transmit and/or receive loops or coils, one or more low noise amplifiers, one or more power amplifiers, one or more filters, one or more duplexers or diplexers, one or more analog-digital and/or digital-analog converters, etc. In embodiments the pressure module 100 may be implemented as TPMS sensor.

The pressure module 100 wirelessly communicates with a transceiver module 200. The transceiver module 200 is configured to communicate with the tire pressure module 100. The transceiver module 200 comprises a transceiver 210, which is configured to wirelessly transmit information related to an instruction to provide information related to a pressure of a tire to the tire pressure module 100. The transceiver 210 is further configured to wirelessly receive the information related to the tire pressure from the tire pressure module. The transceiver 210 is configured to wirelessly transmit and receive in the same frequency band. The transceiver 210 may be implemented as one or more module, devices, or units comprising transceiver components such as transmitter and receiver components. Such components may include one or more elements of the group of one or more transmit and/or receive antennas, one or more transmit and/or receive loops or coils, one or more low noise amplifiers, one or more power amplifiers, one or more filters, one or more duplexers or diplexers, one or more analog-digital and/or digital-analog converters, etc.

FIG. 1 further depicts an embodiment of a control module 300. The control module 300 is configured to determine information related to a pressure of a tire of a vehicle. The control module comprises an interface 310, which is configured to communicate with the transceiver module 200. Such interface may correspond to any wireless or wired interface, which allows for such communication. For example, in a vehicle the interface may correspond to an interface to a vehicle bus such as a Controller Area Network (CAN) bus. The control module 300 further comprises a controller 320, which is configured to determine information related to a state of movement of the vehicle and to communicate information related to an instruction to determine the information related to the pressure of the tire based on the information related to the state of movement of the vehicle. The controller may be implemented as one or more control units or devices, such as a microcontroller, processor, programmable hardware component, etc. The controller may correspond to a processor, a general purpose processor, a digital signal processor, or a programmable hardware component, which is programmed with accordingly adapted software.

Embodiments may make use of information related to the state of movement of a vehicle and base initiation of pressure measurements and localization of pressure modules, e.g. determination of the according position on the vehicle, on information related to the state of movement, which can be expected to be advantageous with respect to the measurements. Embodiments may allow for a reduction in a number of measurements as advantageous situations may be used for the measurements. Such measurements may then be carried out on demand and the pressure module may therefore be operated in a sleeping mode, in which its energy consumption is reduced compared to an operating mode.

In the following a vehicle can be any vehicle using tires, as, for example, a car, a van, a truck, a bus, a plane, a bike, a motorbike, etc. Although, many embodiments will be exemplified using a car, any other vehicle can be utilized in embodiments. The state of movement may have implications on the location and a state of a wheel. In the following the state of movement of a vehicle refers to a movement status, a motion status, a driving or movement situation, a movement or driving condition, etc., as for example, a forward movement, a backward movement, a movement along a right hand bend or curve, a movement along a left hand bend or curve, etc.

In some embodiments the frequency band, which is used for wireless communication, is a Radio Frequency (RF) band, for example, it may lie above a carrier frequency of 1, 5, 10, 20, 50, or 100 MHz. In some embodiments the Industrial, Scientific and Medical (ISM) radio bands may be used, which are radio bands (portions of the radio spectrum) reserved internationally for the use of RF energy for industrial, scientific and medical purposes. Some conventional concepts may trigger a measurement using LF signals and may use LF-transmitters next to each wheel of a vehicle, e.g. mounted to wheel housing. Pressure sensors may comprise receivers for LF-signals, e.g. at 125 kHz. These long-wave signals may only have a short coverage, which results in having multiple LF-transmitters or transmit antennas to cover all pressure sensors. Embodiments may use RF frequency signal, e.g. above 100 MHz, which have better propagation properties and may allow having one transceiver module 200 for multiple pressure modules 100. Embodiments may save costs for multiple LF-transmitters or antennas (for example four LF-antennas in a car), their wiring, respectively. Embodiments may enable pressure measurements on demand, e.g. tire pressure information may be presented to a driver of car at the beginning of a ride or when the vehicle is started.

Some TPMS systems may use sensors which use an RF transmitter, e.g. transmitting signals of multiple 100 MHz, and an RF receiver at the vehicle. Embodiments may also use an RF receiver component at the transceiver 120 such that signals can be received and transmitted in the same frequency band, e.g. RF. Hence, according to embodiments of the pressure module 100 bidirectional communications may be established in the same frequency band. Establishing such communication in an RF band may allow for a larger coverage as compared to LF, and a number of transmitters or transmit antennas may be reduced. The control module 300 may use the transceiver module 200 to carry out different measurement strategies, which may operate the pressure module 100 more energy efficient and will be detailed subsequently.

Some TPMS sensors comprise an acceleration or shock sensor, which detects a centrifugal acceleration and therewith information related to state of movement of the wheel, the vehicle, respectively. A signal from such a sensor may be used as switching or trigger signal, e.g. if a certain acceleration threshold is exceeded, which may correspond to a certain angular velocity of the wheel, the TPMS system may be activated and tire pressure may be measured together with angular or rotational frequencies of the wheel, which can then be correlated with other signals or information for localization purposes for the respective sensor and pressure information. After activation the TPMS system may measure the tire pressure repetitively in a fixed time scale until it is switched off based on a halting of the wheels. The measurement cycles or intervals may be determined statistically and may be based on whether a driving situation is suited for a measurement. Pressure measurement may therefore be repeated and averaged until a certain degree of reliability for the measurement result is achieved, and pressure variations, which can be evoked by shocks on the tires as travelling along the road surface, are eliminated to a certain degree. Similar situations may occur when determining angular or rotational frequencies for the correlation, e.g. measurements may be taken in situations when there are no differences in the angular or rotational frequencies of the different tires, e.g. during straight forward drive of the vehicle. Permanent repetitive measurement cycles and averaging may consume battery energy and a pressure on demand measurement may not be possible.

In embodiments the measurements may be triggered using an RF signal, and the trigger times may be based on certain driving situations of the vehicle. Hence, embodiments may allow taking measurements on demand, e.g. when they are considered as required and the driving situation or state of movement of the vehicle allows for taking such a measurement. In some embodiments the transceiver 120 of the pressure module 100 and the transceiver 210 of the transceiver module 200 are configured to wirelessly transmit and receive on different frequency carriers of the same frequency band. Hence, communication may be carried out using frequency division duplex using the same frequency band. Both modules 100 and 200 may then transmit and receive on different RF frequencies. In some embodiments the transceivers 120, 210 are configured for time division duplex using the same RF frequency, e.g. they are configured to wirelessly transmit and receive on the same frequency carrier. In some embodiments code division multiplexing may be used applying individually assigned orthogonal spreading sequences to different pressure modules 100.

In further embodiments the transceiver module 200 comprises an interface 220, which is shown as optional component in FIG. 1. The interface 220 is configured to communicate with the control module 300. The interface 220 is configured to receive the information related to the instruction to provide the information related to the tire pressure from the control module 300, and to provide the information related to the tire pressure to the control module 300. The control module 300 may then send instructional information or trigger the transceiver module 200 on demand. The transceiver 210 of the transceiver module 200 can then be configured to wirelessly transmit a trigger signal as information related to the instruction to the pressure module 100.

For example, the control module 300 may consider that pressure variations in a tire are rather low during a halt or stop of the vehicles such as during stop-and-go traffic in a downtown area. The controller 320 of the control module 300 may be configured to determine a standstill or a situation of low tire pressure variance of the vehicle based on the information related to the state of movement of the vehicle, and communicate the information related to the instruction to the pressure module 100 via the transceiver module 200 when the standstill or the situation of low tire pressure variance of the vehicle is determined. Such a situation may be determined using any signal indicative for a standstill or stop, e.g. signal from rotational sensors of the wheels. In some embodiments determination of a situation of standstill may not be possible using measurements from the pressure module 1000 itself, hence a situation of low pressure variance, e.g. a situation during which vibrations or shocks at the tires are rather low, may be determined by other means. Such a situation may be detected using signals from the suspension of the vehicle, e.g. from shocks, rotational sensors of the wheels, inertial sensors of mass moment, etc.

In some jurisdictions there may be requirements with respect to the measurement period or the repetition cycle of pressure measurements, a maximum time for detection of pressure loss, respectively. The control module 300 may hence be configured to assure such restrictions as a further boundary condition. In some embodiments the control module 300 may further find a compromise between measurement accuracy and energy consumption.

For the correlation, which may be used for locating the positions of pressure modules 100 and tires on the vehicle other situations may be considered favorable. Such correlation may work better, when differences in the rotational frequencies or travel distances of the wheels are high, for example, when driving a 270° arc or a circle in a roundabout. Moreover, such correlation or positioning may in some embodiments only be considered necessary once per drive of the vehicle, since pressure modules 100 and tires do not change position during a drive. The control module 300 may hence improve or optimize measurement strategies with respect to both pressure measurements themselves and measurements for the purpose of localization. In some embodiments the controller 320 is configured to determine a cornering or circular movement of the vehicle based on the information related to the state of movement of the vehicle. The controller 320 may be further configured to communicate the information related to the instruction when the cornering or circular driving or movement of the vehicle is determined.

In embodiments a measurement strategy may be improved or optimized as measurements on demand may lead to a reduced overall number of measurements and therewith to reduced energy consumption at the pressure module 100. The reduced energy consumption may allow for smaller batteries, smaller and/or lighter pressure modules 100 etc. Pressure modules 100 may be mounted in the tire using more cost effective mounting concepts, e.g. rubber valves instead of steel valves, snap-in concepts etc. More generally, embodiments may contribute to more cost efficient implementations of TPMS-systems and may enable pressure on demand measurements.

The controller 320 is, in some embodiments, configured to locate a position of a wheel on the vehicle based on the information related to the tire pressure and the information related to the state of movement of the vehicle. For example, the controller 320 is configured to locate the position of the wheel of the vehicle based on information related to the tire pressure obtained when the information related to the state of movement of the vehicle indicates a cornering or circular driving of the vehicle. In some embodiments the controller 320 is configured to locate the position of the wheel of the vehicle once between a beginning and an end of a ride of the vehicle. In other words the control module 300 may carry out a measurement strategy, which carries out a correlation for the localization of the pressure module 100 or the respective wheel only once per ride of the vehicle. For example, if the ride is determined to be in down-town traffic, pressure measurements may be carried out when the wheels are stopped and measurements are expected to be more reliable due to missing vibrations or shocks. Moreover, if a route of the vehicle is known, e.g. based on information in or from a navigation system, measurement times may be optimized or adapted to the route, e.g. on favorable situations or state of movements along the route, in order to achieve reliable measurements in an energy-efficient way. Such measurements may then be initiated at the pressure module 100 by the control module 300 via the transceiver module 200 using an accordingly adapted RF-signal. In embodiments the beginning or end of such a ride may be determined by an unlocking or locking operation on the vehicle, insertion or removal of a key, start or stop of a vehicle engine, detection of seat occupancy, seat belt signal for the driver, etc.

Embodiments may provide a system for locating a position of a wheel or pressure module 100 on a vehicle. The system may comprise a detector for obtaining information related to the state of movement of the vehicle and a locator, e.g. implemented in the controller 320, for determining the position of the wheel based on the information related to the state of movement of the vehicle. In further embodiments the locator may be operable to further use information on a rotational frequency of the wheel to determine the position of the wheel based on the information related to the state of movement of the vehicle. Embodiments may make use of the finding that a certain state of movement of a vehicle may imply a certain relation of the rotational frequencies of the wheels. In other words, embodiments may make use of the finding that the RR wheel of a car moving forward along a right hand bend may have a lower rotational frequency than any of the other wheels on the car, assuming equal circumferences of the wheels. Therefore, if the information related to the state of movement indicates a forward right hand bend the locator may determine the position of the wheel being indicated as the one with the lowest rotational frequency as the RR wheel.

In some embodiments the information related to the state of movement may comprise information on a sense of a rotation of the vehicle. The sense of rotation of a vehicle may be used to determine expected rotational frequencies or expected relations of rotational frequencies of the wheels associated to the sense of rotation of the vehicle. In further embodiments the information related to the state of movement may comprise information on a direction of the movement of the vehicle, e.g. information on whether the vehicle moves forward or backward, along a right hand bend or a left hand bend, etc. Information on the direction of the movement of the vehicle may also be used to determine expected rotational frequencies or expected relations of rotational frequencies of the wheels associated to the sense of rotation of the vehicle.

The locator or controller 320 may be operable to use information on rotational frequencies for each of a plurality of wheels on the vehicle, as, for example, four wheels of a car. The locator or controller 320 may be further operable to determine a position for each of the plurality of wheels on the vehicle based on the information on the plurality of rotational frequencies and the information related to the state of movement of the vehicle. In other words, the locator or controller 320 may determine predefined positions of the four wheels of a car, by determining four rotational frequencies, one for each of the wheels, and by determining four expected rotational frequencies based on the information related to the state of movement. In some embodiments the locator or controller 320 comprises an interface to receive information on an expected rotational frequency from a device configured to determine information related to one or more expected rotational frequencies of one or more wheels of a vehicle. That is to say, information related to the expected rotational frequencies may be provided to the locator or controller 320, which may then carry out a correlation between the expected rotational frequencies and the rotational frequencies determine from a sensor or the pressure module 100 to determine one or more positions of the wheel(s). In some embodiments information related to rotational frequencies of one or more wheels of the vehicle may be provided to the detector, e.g. as information related to a state of movement or related to a steering angle of the vehicle.

The information on the rotational frequency of the wheel may be obtained using an acceleration sensor, which may be further comprised in the pressure module 100 or in the tire. The acceleration sensor may be installed on the wheel such that a sensitive axis of the acceleration sensor has a radial orientation. Hence it senses a change in the acceleration of gravity when the wheel turns, in particular a +/−g change.

In other embodiments, TPMS sensors or pressure modules 100 may be used to determine the information on the rotational frequency of the wheel. A TPMS sensor 100 may be mounted on the cover of the tire such that a g-pulse is measured when the TPMS sensor hits the surface of the road. An acceleration sensor may be used in the TPMS sensor 100 or pressure determiner 110, e.g. for that purpose. The TPMS sensor 100 may be equipped with an energy harvester or a nano generator, e.g. as they are used in battery-free TPMS sensors, which convert the mechanical energy of the pulse when the TPMS sensor hits the ground into an electrical signal from which the information on the rotational frequency of the wheel can be determined. In further embodiments the pressure module 100 or system 400 may use an acceleration or shock sensor to determine the information on the rotational frequency of the wheel, e.g. by making use of gravity. Yet another embodiment of the system 400 may comprise a TPMS sensor 100 to obtain the information on the rotational frequency of the wheel by evaluating the cyclic variations of the TPMS-RF signals.

In some embodiments the controller 320 may comprise a locator, which is operable to use information on rotational frequencies for each of a plurality of wheels on the vehicle, e.g. the four wheels of a car. Moreover, the locator 120 is operable to determine a position for each of the plurality of wheels on the vehicle based on the information on the plurality of rotational frequencies and the information related to the state of movement of the vehicle, the information related to the steering angle, respectively. In other words, the system 400 may use multiple sensors or pressure modules 100 for the determination of the rotational frequencies of the wheels, e.g. it may use one sensor per wheel.

The system 400, which will be further described in the sequel, illustrated in FIG. 1, may form an autonomous system for locating the wheel, which may be independent from other systems such as ABS, and other data from the vehicle. The independence can be achieved by using the information related to the state of movement or the steering angle of the vehicle, which may comprise information on a sense of a rotation of the vehicle and/or information on a direction of movement of the vehicle. The system 400 or the controller 320 may detect the information on the state of movement or the information related to the steering angle of the vehicle based on a corresponding sensor. In other embodiments information on the state of movement or on expected rotational frequencies may be received from another device, e.g. a navigation device or system. In other words the controller 320 may be configured to obtain the information related to the state of movement of the vehicle from a navigation system of the vehicle. In some embodiments the controller 320 may be configured to obtain the information based on information related to a steering angle of the vehicle, or based on information related to rotational frequencies of one or more wheels of the vehicle.

Such information may be in terms of different path lengths or expected rotational frequencies of one or more wheels. The system 400 or the controller 320 may comprise an accordingly configured interface to receive information related to path lengths or expected rotational frequencies. For example, the system 400 or the controller 320 may comprise an inertial sensor, which enables determination of the information related to the state of movement of the vehicle. Additionally or alternatively, the controller 320 may comprise or use a magnetic sensor, which senses a signal from a power steering. The sensor may sense the position of magnetic checkmarks on a steering column or axis of the vehicle. Such a sensor may also be used for other functionalities such as Electronic Stability Control (ESP) in the vehicle. In embodiments, the system 400 or controller 320 may comprise at least one of an angular sensor, a traverse arm position sensor, an optical sensor, or a magnetic sensor, wherein each are configured to generate a signal based on which the steering angle is detectable. In other words, the system 400 or controller 320 may comprise a sensor, which is capable of determining the information related to the steering angle, for which there are multiple possibilities. For example, a signal from a power steering unit may be determined, e.g. using an angular sensor. In some embodiments, a signal, which is also used for an ESP, may be used for determining the steering angle. A position of the steering wheel indicative of a steering angle may be monitored using a magnetic or an optical sensor, which may, for example monitor magnetic or optical checkmarks on the steering wheel, a steering shaft or axis, or a steering column.

In other embodiments the system 400 or the controller 320 may comprise a micro-mechanical sensor (Micro-Electro-Mechanical Systems (MEMS)), an acceleration sensor, or a gyroscope for generating a signal based on which the state of movement is detectable. The inertial sensor may correspond to a rotation rate sensor or a combination of a rotation rate sensor and a single- or multi-axial acceleration sensor. A sensitive axis of the rotational rate sensor may be oriented basically orthogonal to a movement plane of the vehicle, such that the sensor can be used as yaw-sensor. In embodiments, the inertial sensor may not be located in a wheel but at a more central position, e.g. in the transceiver module 200 for the TPMS-RF signals.

It is to be noted that in embodiments the absolute accuracy of such an inertial sensor may not be very high. As the sensor may only be used to determine a certain state of movement or a movement situation, e.g. a certain rotational rate or directional movement of the vehicle. In other words, a certain state of movement may be determined before the localization of the wheel is carried out. Since the accuracy or precision demands for the sensor are low, embodiments of the system 400 can be economically implemented. For example, a MEMS inertial sensor may be used, as it is produced in high numbers for other applications already.

Thus, an algorithm for localizing the wheel may be carried out in a certain state of movement of the vehicle; it may be carried out based on signals obtained in the certain state of movement of the vehicle, respectively. In other words, the controller 320 may use the inertial sensor to determine whether the vehicle moves along a left hand bend or along a right hand bend. Moreover, the controller may determine whether the vehicle moves in a forward or in a backward direction. For example, a comparison of the rotational frequencies of the wheels with the rotational rate of the vehicle may determine or trigger an operating point for the localization. In some embodiments such trigger information may be received from another device. The controller 320 may then comprise an accordingly configured interface to receive said information.

In embodiments the system 400 may also be operable to verify a signal indicating the rotational frequency of the wheel and a signal indicating the state of movement or the steering angle of the vehicle before using the signals as information to determine the position of the wheel. For example, the system 400 or the controller 320 may be operable to verify that the rotational frequency of the wheel and a rotational rate of the vehicle, which is based on the state of movement or the steering angle of the vehicle, fulfill a predefined relation for a predefined time interval. In embodiments such verification may be carried out using different mechanisms. According to another embodiment, the controller 320 is operable to determine the position of the wheel when changes of the state of movement or the steering angle of the vehicle are below a predefined threshold for a predefined time interval. That is to say, the position of the wheel is determined when the state of movement or a steering angle of the vehicle is stable to a certain extent, e.g. when variations of a certain rotational rate or steering angle of the vehicle and the rotational frequencies of the wheels remain in certain boundaries.

The controller 320 may then assign predefined positions on the vehicle to each of the plurality of wheels based on the information on the plurality of rotational frequencies and on expected rotational frequencies, wherein the expected rotational frequencies are based on the information related to the state of movement or the steering angle. In line with what is described above, in some embodiments the sense of movement, i.e. whether the vehicle moves forward or backward and whether it rotates clockwise or counterclockwise, serves as basis for the localization and an inertial sensor may be used to generate a signal based on which the sense of movement is determined. In some embodiments the steering angle may be used. Other embodiments may use other means to determine the state or sense of movement. For example, in some embodiments other signals available from the vehicle may be used. For example, an indication on whether the vehicles moves forward or backward may be obtained from the transmission components, such as an indication for a reversing or back-up light. Moreover, signals from a power steering unit maybe used to determine whether the vehicle steers towards a right hand bend or a left hand bend. The steering angle may be determined from such a power steering unit.

Furthermore, the information on rotational frequencies of the wheels may be used to determine information related to the state of movement or the steering angle. For example, if a certain rotational frequency is exceeded, e.g. a certain threshold for the rotational frequency, it may be assumed that the vehicle moves forward, as the backward speed of most vehicles is limited. A comparison of the minimum and maximum rotational frequencies of all tires may determine whether the vehicle moves along a bend since the tires closer to a center of a bend or curve rotate slower than tires farther away from the center of the curve. As will be shown in more detail subsequently, if a vehicle moves through a given bend, certain rotational rates or relations of the rotational rates result for its wheels.

In some embodiments a backward movement of the vehicle may be precluded using other measures as described above. In such an embodiment a rotational sensor with a single axis can be used to determine a signal based on which the information related to the state of movement is detected. The sensitive axis of such a sensor may then be oriented in parallel to the normal (z-axis) of the plane of movement of the vehicle. When the vehicle moves along a right hand bend the rotational sensor may provide a negative output signal, a positive output signal may result in a left hand bend. Backward movement may be precluded by determining a certain duration of such a signal, since long time backward movements are unlikely.

In some embodiments, determination or preclusion of a backward movement may be used to determine the sense of rotation of the vehicle. For example, a forward movement along a right hand bend may result in the same sense of rotation as a backward movement along a left hand bend. The determination or preclusion of the backward movement may then be used to distinguish the right and left hand wheels of the vehicle.

In order to distinguish four different states of movement using a combined sensor comprising a rotational rate sensor and a lateral acceleration sensor may be used as an inertial sensor in a particular embodiment. The sensitive axis of the acceleration sensor corresponds to the lateral axis of the vehicle (y-axis), i.e. to the axis pointing in radial direction when the vehicle moves along a bend or curve. The outputs of the two sensors are given by the following table:

| Driving situation, state of movement | Rotational rate sensor | Acceleration sensor |
| --- | --- | --- |
| Forward, right hand bend | Negative | negative |
| Forward, left hand bend | Positive | positive |
| Backward, right hand bend | Positive | negative |
| Backward, left hand bend | Negative | positive |

The table shows that a non-ambiguous distinction of the four states is enabled using the combined sensor. In a similar way the driving situation or the state of movement may be determined from the steering angle. If the steering angle is to the left the vehicle moves along a left hand bend, if the steering angle is to the right the vehicle moves along a right hand bend. Embodiments may make use of the finding that the rotational frequencies of the wheels, e.g. of the four wheels of a car, differ by multiple percent especially when the vehicle moves along narrow curves or bends. This assumption is based on a further assumption that the circumference or the perimeter of the wheels is essentially similar. Some embodiments may assume that the localization of the wheels is carried out directly after a change of the wheels and that the air pressure in the tires of the wheels corresponds to a set pressure according to the respective manufacturer's requirements. This leads to the conclusion that the circumferences of the tires are essentially equal. Other embodiments may assume that the air pressure of all tires and their circumferences are the same.

Yet other embodiments may use TPMS signals or pressure information to correct the information on the rotational frequencies. In other words, such embodiments may determine the rotational frequency of a wheel and the corresponding air pressure in the tire of said wheel. If the air pressure differs from a predefined air pressure setting for the wheel, the rotational frequency may be corrected accordingly, i.e. if the air pressure is too low a corrected rotational frequency may be increased, or decreased if the air pressure of the tire is too high. In other words, the controller 320 may be operable to determine a corrected rotational frequency of the wheel based on information on a tire pressure of a tire of the wheel and based on the rotational frequency of the wheel. The controller 320 may then be operable to determine the position of the wheel based on the corrected rotational frequency. Moreover, it is assumed that each wheel or sensor provides its signal together with a non-ambiguous IDentification (ID), such that each signal can be unambiguously associated to the respective wheel or sensor.

The algorithm of an embodiment may then comprise the following steps. At first, a reference wheel (unique ID) may be selected and based on the rotational frequency of the reference wheel and the rotational rate or the steering angle of the vehicle an advantageous operating point or state of movement of the vehicle is determined. Once the operating point is reached, the rotational frequencies of the four wheels are determined and compared. For a given state of movement or steering angle, e.g. a forward right hand bend, the relations of the rotational frequencies of the wheels are predetermined, e.g. which wheel has the highest and which wheel has the lowest rotational frequency. Thus expected rotational frequencies or relations thereof may be determined based on the state of movement or the steering angle. Each of the four wheels may then be associated with a respective position, e.g. by matching the expected rotational frequencies with the detected rotational frequencies of the wheels. The rotational rate and direction of movement of the vehicle may be determined based on signals which were measured by the inertial sensor or from signals being indicative of the steering angle of the vehicle. In some embodiments the procedure just described may be repeated until a certain statistical confidence is achieved.

In some embodiments the controller 320 is configured to determine information related to one or more expected rotational frequencies, which may in some embodiments be used to determine the above information related to the state of movement of the vehicle. The controller 320 may comprise a path detector configured to determine expected path lengths of the one or more wheels of the vehicle based on information related to a path of the vehicle. The controller 320 may further be configured to determine the information related to the one or more expected rotational frequencies of the one or more wheels of the vehicle based on the expected path lengths of the one or more wheels. The controller 320 may optionally comprise a navigation module configured to determine the information related to the path of the vehicle based on information related to a route of the vehicle.

In some embodiments the path detector may obtain the path of the vehicle itself, e.g. by tracking or monitoring the vehicle. In embodiments the path detector may comprise a Global Positioning System (GPS) receiver—or any other navigation unit. In some embodiments the system 400 may further comprise a navigation module configured to determine the information related to the path of the vehicle based on information related to a route of the vehicle. The navigation module may comprise a GPS—or any other navigation unit, which allows tracking, determining, or predicting a route or path of the vehicle. For example, the route may be entered by user, e.g. in terms of a destination of a trip to which the actual route is then determined or calculated based on navigational map data. In some embodiments a navigation system, comprising the above components, may determine the path lengths for one or more wheels of the vehicle based on the route or a part of the route of the vehicle and correlates these, information related to corresponding rotational frequencies, respectively, with measured or otherwise determined rotational frequencies, e.g. using the above described sensors, such as a TPMS sensor 100 and the signals received therefrom. In some embodiments the controller 320 is further configured to determine the information related to the expected rotational frequencies of the one or more wheels of the vehicle based on predefined geometry information of the one or more wheels of the vehicle. The geometry information may comprise information related to, e.g., distances between the axis, between the wheels, width of the vehicle/axis, length of the vehicle/axis, etc. In some embodiments, the start and end point of a ride may be known from the navigation system of the vehicle. The control module 300 may then be configured to use navigation data, e.g. GPS data, to determine an energy efficient measurement concept for the upcoming route, e.g. considering standstills (e.g. at intersections), curve radii and velocity of the vehicle, etc.

Figure 2:
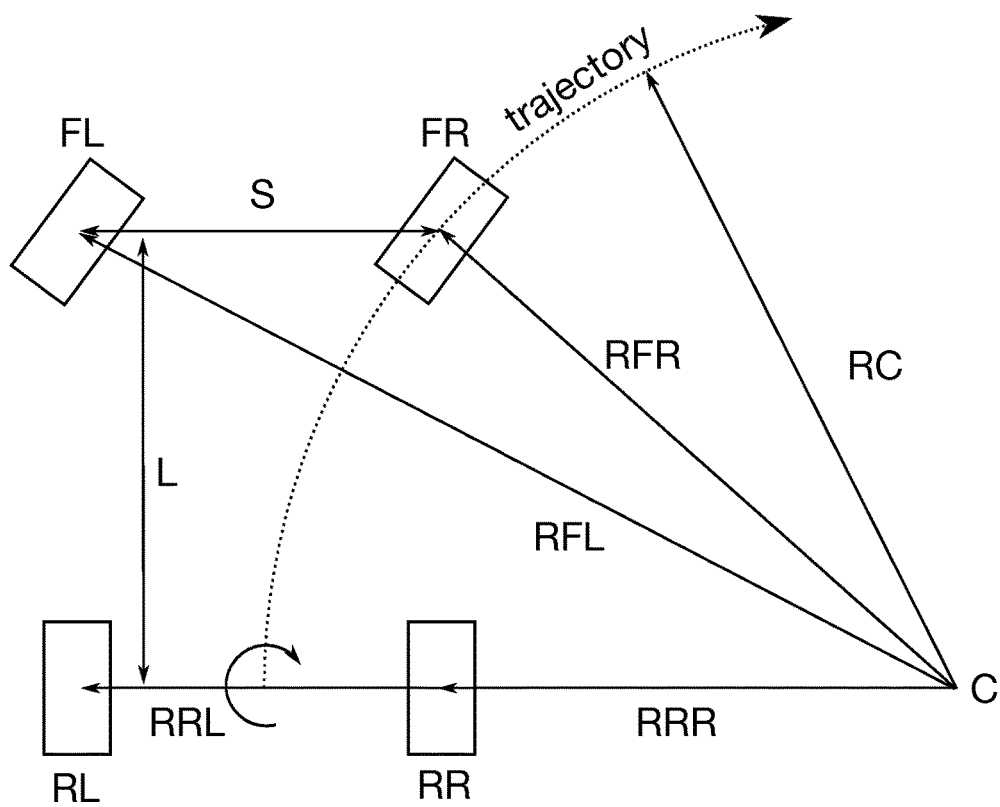
FIG. 2 shows four wheels of a vehicle, which are located in an embodiment.

In the following an embodiment will be described, wherein the controller 320 is further configured to determine the information related to the expected rotational frequencies of the one or more wheels of the vehicle based on predefined geometry information of the one or more wheels of the vehicle, as will be further detailed subsequently using illustrations shown in FIG. 2. FIG. 2 illustrates the four wheels of a vehicle in an embodiment. FIG. 2 shows two front wheels FL and FR, as well as two rear wheels RL and RR. Moreover, in the illustration of FIG. 2 it is assumed that the vehicle moves along a forward right hand bend, where the center of the bend or curve is indicated by C. The angle of the front wheels FL and FR indicates movement along the right hand bend. It is further assumed that the distance between left and right wheels is S, i.e. the distance between FL and FR, as well as between RL and RR, respectively. Moreover, the distance between front and rear wheels is assumed to be L, i.e. the distance between FL and RL, between FR and RR, respectively. FIG. 2 further depicts the radii of each of the wheels and the curve or trajectory itself using different arrows. The radius of the curve or bend itself is labeled RC, the radius of the RR wheel is termed RRR, the radius of the RL wheel is termed RRL, the radius of the FL wheel is termed RFL, and the radius of the FR wheel is termed RFR. Furthermore, the trajectory of the FR wheel is given using a dotted arrow, which points along a circular segment. Furthermore, if the paths of a vehicle, e.g. whether it moves through right hand or left hand bend, the path lengths of each of its wheel may be determined. The depicted geometry allows determining the radii of each wheel and hence information on the path lengths of the individual wheel, at least of a relation between the path lengths of the wheels.

The geometry of the vehicle shown in FIG. 2 allows deriving expected rotational frequencies of wheels and relations thereof based on the distances L, S, and RC, the path of the vehicle, respectively. As it can be seen from FIG. 2 each of the wheels travels along a different radius (RRR, RRL, RFL, RFR) around the center C of the curve, resulting in different distances, and thus in different rotational frequencies, when equal circumferences for the wheels are assumed. The velocity of each wheel is then proportional to the radius of the wheel's trajectory, to its rotational frequency, respectively. Moreover, the shorter the radius of the curve, i.e. the narrower the curve, the higher the difference in the individual radii (RRR, RRL, RFL, RFR). The radii can be given using the following equations:

$$RRL = RC + \frac{S}{2},$$

$$RRR = RC - \frac{S}{2},$$

$$RFL = \sqrt{L^2 + \left(RC + \frac{S}{2}\right)^2}, \text{ and}$$

$$RFR = \sqrt{L^2 + \left(RC - \frac{S}{2}\right)^2}.$$

Figure 3:
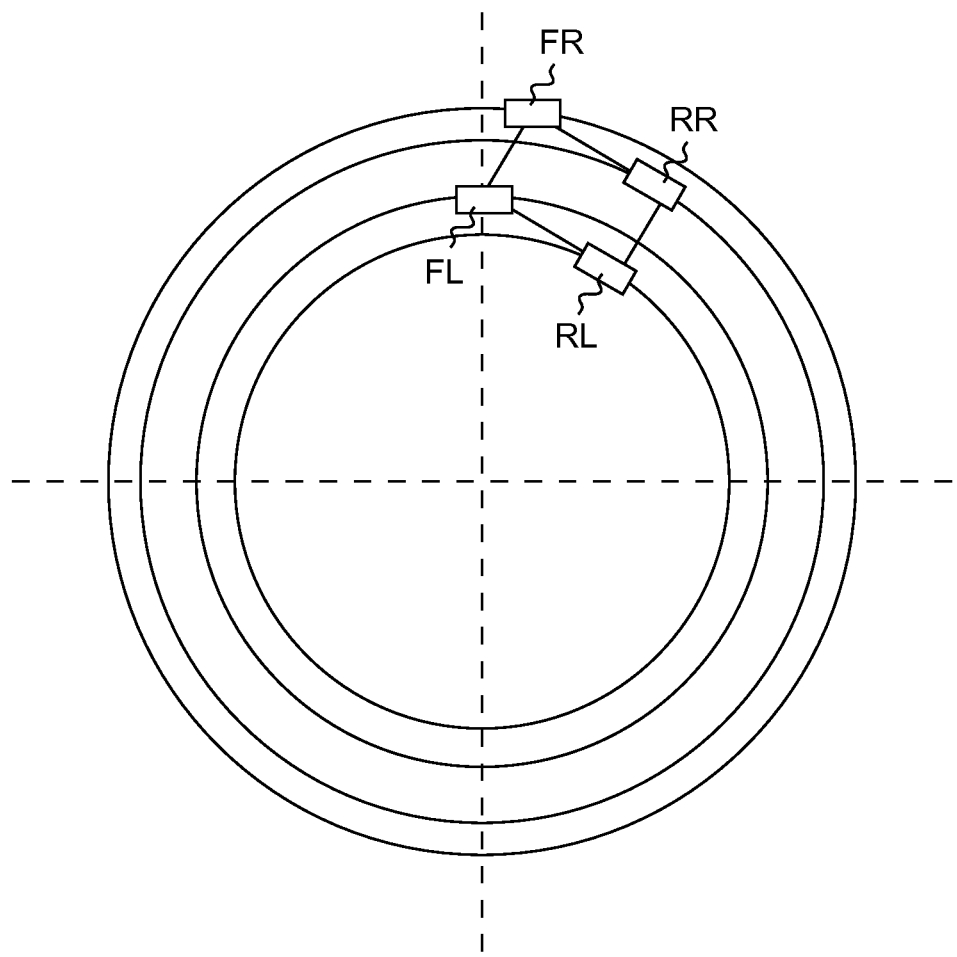
FIG. 3 shows four wheels of a vehicle, which are located in an embodiment, from an overview perspective depicting the differences in the travel distances of the wheels.

The equations show that the difference in the rotational frequencies of the wheels depends on the radius RC of the curve itself (the path of the vehicle), the wheel base L, and the wheel track S. FIG. 3 shows four wheels (FR, RR, FL, RL) of a vehicle, which are positioned in the embodiment. The overview perspective depicts the differences in the travel distances of the wheels. From FIG. 3 it can be seen that the four wheels travel different distances when the vehicle moves along a bend as they travel along circles with different diameters and hence with different circumferences. The relative differences in the distances depend on the steering angle, which determines the radii of the circles. According to some embodiments the steering angle, the path of the vehicle, the velocity of the vehicle or the differences in the travel distances of the wheels and/or the geometry of the vehicle (wheel base, track gauge, size of the tires) may serve as a basis for determining expected rotational frequencies or at least an order of expected frequencies of the wheels of the vehicle. With the signals of a TPMS-sensor, which comprises an acceleration sensor and senses acceleration changes while rotating in gravitation, the rotational frequencies of the wheels and hence the order of them, can be determined as well. Correlating or matching these signals or their order then allows assignment of a TPMS-signal to the respective wheel and hence their positions.

In some embodiments the information related to the rotational frequencies comprises information related to an order of expected rotational frequencies or expected path lengths of a plurality of wheels of the vehicle, which may then be used for an according correlation. The controller 320 of the embodiment illustrated in FIG. 1 may be configured to determine one or more positions of the one or more wheels of the vehicle based on the information related to the expected rotational frequencies of the one or more wheels, e.g. using the above-described correlation. The controller 320 may be configured to generate information related to a trigger when to determine the position of a wheel and the controller 320 may be configured to provide the information related to the trigger, when the expected rotational frequencies of the one or more wheels of the vehicle fulfill a predefined criterion, for example, when differences of path lengths or expected rotational frequencies lie above a predefined threshold. Accordingly, the controller 320 may then use the information on the expected rotational frequencies for an according correlation based on the trigger, e.g. it may generate the trigger signal for the transceiver module 200 and the one or more pressure modules 100.

In some embodiments the controller 320 may be configured to receive information related to one or more tire pressures of the one or more wheels or pressure modules 100 of the vehicle. The controller 320 may be further configured to receive information related to one or more rotational frequencies of the one or more wheels, for example, from one of the above described sensors. An according correlation may then be carried out by the controller 320. For example, the controller 320 may be configured to associate the information related to the one or more tire pressures to one or more positions of the one or more wheels based on the information related to the one or more rotational frequencies and based on the information related to the one or more expected rotational frequencies of the one or more wheels of the vehicle.

Embodiments may enable to position or locate sources of signals received from TPMS sensors or pressure modules 100. The controller 320 may be configured to determine an expected path length for each of a plurality of wheels on the vehicle based on the information related to the path of the vehicle. The controller 320 may be configured to determine information related to an expected rotational frequency for each of the plurality of wheels on the vehicle, and the controller 320 may be configured to determine a position for each of the plurality of wheels on the vehicle based on the information on the plurality of expected rotational frequencies and based on the expected path lengths for each of the plurality of wheels of the vehicle. For example, the controller 320 may be configured to assign predefined positions on the vehicle to each of the plurality of wheels based on the information on the plurality of expected rotational frequencies.

In some embodiments the control module 300 may be configured to receive information related to tire pressures for each of the plurality of wheels of the vehicle. The controller 320 may be configured to associate the information on the tire pressures to positions of each of the plurality of wheels based on the information related to the rotational frequency for each of the plurality of wheels and based on the information related to the expected rotational frequency for each of the plurality of wheels of the vehicle.

For example, a navigation system may determine the differences in the path lengths of the wheels. In embodiments a vehicle path may be selected in which the differences in path lengths or travel distances of the wheel are significant enough to enable clear distinction of the wheels by their path lengths or rotational frequencies. For example, a motorway junction or interchange may have a typical diameter of 60 m, which may lead to differences in path lengths between inner and outer wheels in the bend or curve of about 5%. A rotary intersection or a roundabout with diameter of 15 m may provide differences of about 20%. In some embodiments a TPMS-sensor 100 may transmit tire pressure information in equidistant time intervals to a receiver, the rotational frequency of the wheel may be determined based on these signals or the signal may comprise information related to the rotational frequency already determined by the TPMS-sensor 100. In some embodiments the TPMS-sensor may provide tire pressure information on demand or after a predetermined number of wheel rotations, which allows determining information on the rotational frequency or the path length of a wheel from the time between subsequent provisions of the tire pressure information. Information on the rotational frequency of a wheel may hence be determined from the tire pressure signals and may then be correlated with the expected rotational frequencies to locate the corresponding tire on the vehicle. Such reporting of tire pressure information may be related to a wake-up cycle of the pressure module 100, which will be detailed subsequently.

FIG. 3 displays an example of a vehicle travelling along a left hand bend. The trajectories of the wheels correspond to circles and they show that the wheel closest to the center of the bend or curve, i.e. wheel RL travels the shortest distance, followed by wheel FL, which travels the second shortest distance. The wheel FR, which is located the farthest away from the center, travels the longest distance and wheel RR travels the second farthest distance and lies between the wheels FR and FL. FIG. 3 further shows that the differences between the radii of the wheel closest to the center and the wheel farthest from the center approximately matches the wheel base of the vehicles, which approximately may, for example, correspond to 1.5 m.

Figure 4:
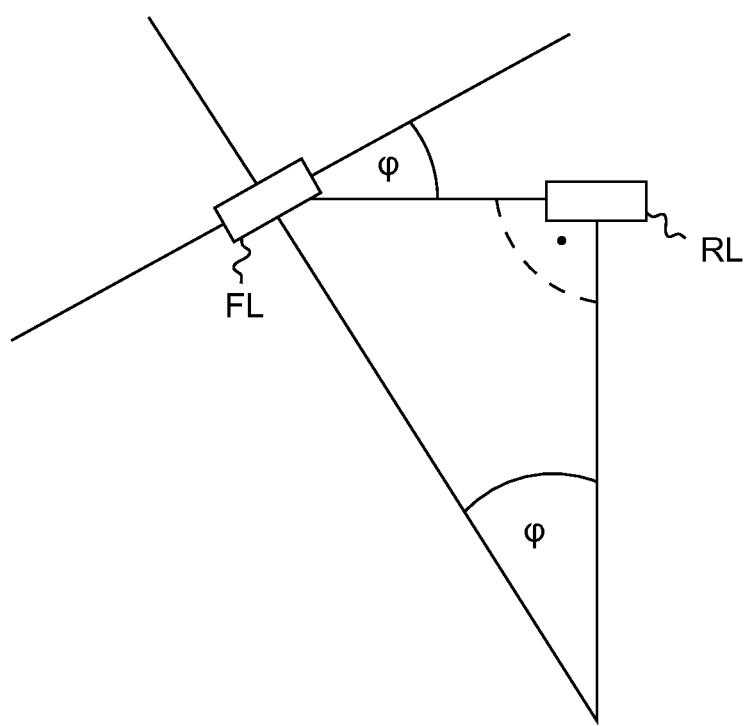
FIG. 4 depicts the dependency of the angle between the wheels and the steering angle.

FIG. 4 depicts the dependency of the angle between the wheels and the steering angle. As the rear axis of the vehicle depicted in FIG. 4 is assumed to be non-steered, i.e. it points along the radius of the bend, the relation between radii of the FL wheel and the RL wheel correspond to the cosine of the angle φ, which also corresponds to the steering angle. In line with the Figures, the distances or rotational frequencies of the wheels can be determined from the geometric evaluations. In embodiments a TPMS-sensor may provide the TPMS-signals in regular time frames, i.e. the signals with information related to the pressure of the tires may be transmitted on a fixed time frame, such as every 1 s, 2 s, 5 s, 10 s, 15 s, 20 s, 25 s, 1 min, etc. In such embodiments a TPMS-sensor may transmit information on the rotational frequency of the wheel along with the pressure information. For example, the number of rotations of the wheel since the last transmission or a present rotational frequency may be included. In other embodiments such signals may be transmitted on a rotational frame basis. That is to say that the TPMS sensor may transmit the pressure signal every predefined number of rotations, such as every 3, 5, 10, 15, 20, 25, 50, etc. rotations, which may define a wake-up cycle of the pressure module 100. From the time between two or more transmissions of the pressure signals of a wheel, the controller 320 may conclude on the rotational frequency. In other words, the time span between two transmissions of the pressure signal for a wheel is indicative of the distance the wheel traveled since the last transmission. In both cases the determined data can be correlated with the data determined based on the state of movement or the steering angle as basis for the positioning of the respective wheels. Such correlation can also be carried out based on pressure on demand measurements, e.g. after a favorable state of movement has been identified by the controller 320 a trigger signal may be send to the pressure module 100 through the transceiver module 200. The pressure module 100 may then start to report pressure information.

Considering the geometry of a typical compact car, e.g. a Volkswagen Golf, and different radii RC of the curve the following table can be calculated using the above equations and using the RR wheel as a reference. A forward movement along a right hand curve yields:

| Radius of the Curve | Relative rotational frequency with respect to RR | | | |
|---|---|---|---|---|
| RC [m] | RR [%] | FR [%] | RL [%] | FL [%] |
| 5.0 | 0.00 | 14.54 | 26.69 | 33.03 |
| 7.5 | 0.00 | 6.58 | 18.62 | 22.29 |
| 10.0 | 0.00 | 3.66 | 14.30 | 16.64 |
| 15.0 | 0.00 | 1.59 | 9.77 | 10.94 |
| 20.0 | 0.00 | 0.88 | 7.41 | 8.12 |
| 25.0 | 0.00 | 0.56 | 5.98 | 6.44 |

The table shows that the relative difference in the rotational frequencies increases with decreasing radius RC of the curve or bend, and so do the travel distances of the wheels, respectively. Therefore, some embodiments may determine a movement along a narrow curve as operating point. In other words, in some embodiments it is verified that the vehicle moves along a narrow curve before determining the rotational frequencies based on which the wheels are positioned. Determination of such an operating point may therefore correspond to the determination of a small radius RC of the curve. In some embodiments a measurement of the rotation rate of the vehicle may not be sufficient, since a fast movement along a curve or bend with a large radius may result in the same rotational rate for the vehicle as a slow movement along a curve or bend with a small radius. Some embodiments may therefore evaluate a quotient of the rotational frequency of a reference wheel and the rotational rate for the vehicle, which is proportional to the radius of the curve and may therefore support the determination of a proper operating point, the travel distances of the wheels, respectively.

As it has already been mentioned above in embodiments it may first be verified that the signals or frequencies which are used for such a comparison are stable to certain extent. For example, a certain time period may be evaluated during which variations of the respective signals are below a threshold. Embodiments may therefore prevent errors or deviations, which could occur when the vehicle moves along a sinuous line at a higher speed. In implementations of embodiments, advantageous ranges for the rotational frequencies of the wheels and the rotational rate of the vehicle may be determined experimentally.

In some embodiments the pressure module 100 may further comprise a controller 130, which is illustrated in FIG. 1 as optional component. The controller 130 may be configured to control the pressure determiner 110 and the transceiver 120. The controller 130 is further configured to operate the pressure determiner 110 and/or the transceiver 120 in an operating mode and in a sleeping mode, wherein an energy consumption of the pressure determiner 110 and/or the transceiver 120 is lower in the sleeping mode than in the operating mode.

In some embodiments, the controller 130 may be configured to transfer the pressure determiner 110 from sleeping mode to operating mode after the transceiver 120 has wirelessly received the information related to the instruction to provide information related to the pressure of the tire. The controller 130 may be further configured to transfer the pressure determiner into the sleeping mode after the information related to the pressure of the tire has been determined, and/or the controller 130 may be further configured to transfer the transceiver into the sleeping mode after the information related to the pressure of the tire has been transmitted. In other words, the components of the pressure module 100 may be transferred to the more energy-efficient sleeping mode whenever no measurements are expected, e.g. after a measurement was taken, after a period of standstill, etc. Embodiments may still implement a pressure on demand functionality. The controller 130 may be configured to transfer the pressure determiner 110 and/or the transceiver 120 between sleeping mode and operating mode alternately based on a wake up cycle. The transceiver 210 of the transceiver module 200 may be configured to transmit the trigger signal repetitively for a predefined time period, which may be based on a wake up cycle of the tire pressure module. Hence, in some embodiments the transceiver module 200 may send the trigger or instructional information for a time period longer than the wake up cycle of the pressure module 100, as energy consumption is not as critical for the transceiver module 200 as for the pressure module 100.

Furthermore, the controller 130 may be configured to base the wake up cycle on information related to a state of movement of the tire in further embodiments. That is to say that the wake up cycle may be longer, e.g. during longer highway rides with rather constant high speed, than in down-town traffic. The controller 130 or the pressure module 100 may comprise a sensor configured to determine information related to the state of movement of the tire. For example, a TPMS sensor or pressure module 100 may comprise an acceleration or shock sensor coupled to the controller 130, such that the controller may determine a state of movement of the pressure module 100 or tire, e.g. to determine a period of standstill or halt of the wheels and to switch the transceiver off if such period exceeds a certain time.

In embodiments, a TPMS system 400 may comprise a TPMS sensor 100 and a transceiver module 200 with transmitter and receiver components, i.e. the above described transceivers 120, 210. The control module 300 may have access to further information from the vehicle, for example, a navigation system, rotational sensors of the wheels, steering angle sensors, e.g. through a vehicle bus such as CAN. The transceiver module 200 may be implemented as separate module or it may be combined with other components, e.g. a combined transceiver module 200 for TPMS and wireless key signaling, such as Remote Keyless Entry (RKE), which tends to us bidirectional RF communication anyway and which may therefore allow cost effective realization of the transceiver module 200.

Figure 5:
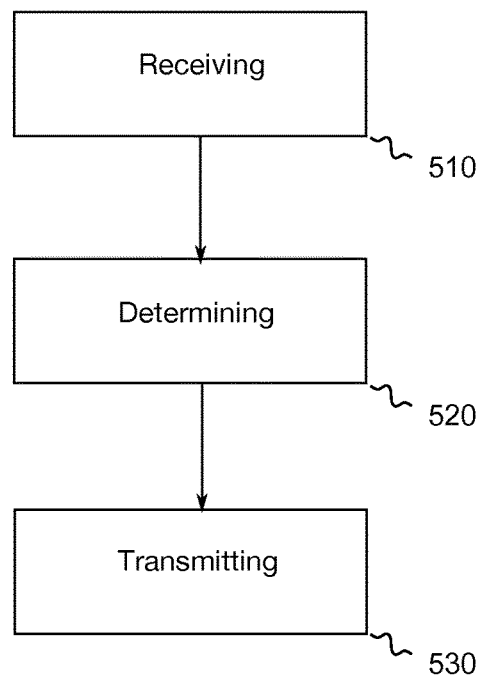
FIG. 5 shows a flow chart of an embodiment of a method for providing information related to a pressure of a tire.

FIG. 5 shows a flow chart of an embodiment of a method for providing information related to a pressure of a tire in a vehicle. The method comprises wirelessly receiving 510 information related to an instruction to provide the information related to the pressure of the tire in a frequency band. The method further comprises determining 520 the information related to the pressure of the tire and wirelessly transmitting 530 the information related to the tire pressure in the frequency band.

Figure 6:
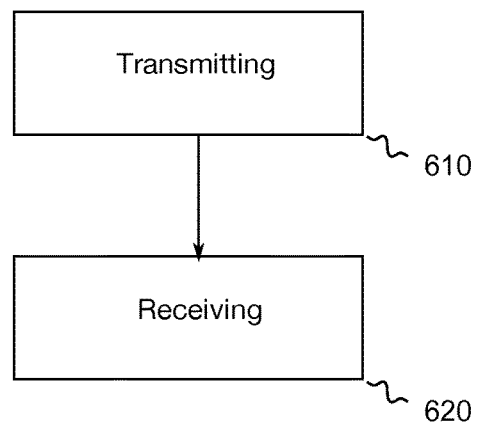
FIG. 6 shows a flow chart of an embodiment of a method for communicating with a tire pressure module.

FIG. 6 shows a flow chart of an embodiment of a method for communicating with a tire pressure module 100. The method comprises wirelessly transmitting 610 information related to an instruction to provide information related to a pressure of a tire to the tire pressure module 100 in a frequency band. The method further comprises wirelessly receiving 620 the information related to the tire pressure from the tire pressure module 100 in the frequency band.

Figure 7:
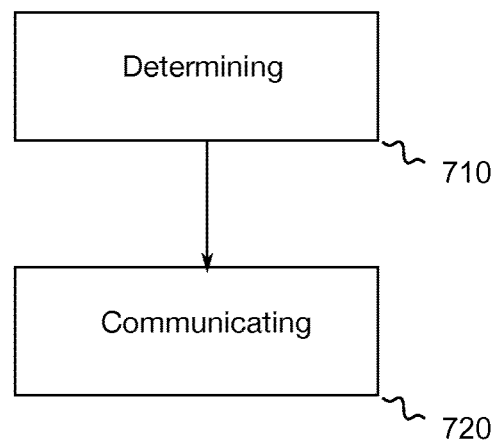
FIG. 7 shows a flow chart of an embodiment of a method for determining information related to a pressure of a tire.

FIG. 7 shows a flow chart of an embodiment of a method for determining information related to a pressure of a tire of a vehicle. The method comprises determining 710 information related to a state of movement of the vehicle, and communicating 720 information related to an instruction to determine the information related to the pressure of the tire to a transceiver module 200 based on the information related to the state of movement of the vehicle.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A pressure module configured to provide information related to a pressure of a tire in a vehicle, comprising:
a pressure determiner configured to determine the information related to the pressure of the tire;
a transceiver configured to:
wirelessly receive information related to an instruction to provide the information related to the pressure of the tire;
wirelessly transmit the information related to the tire pressure; and
wirelessly transmit and receive in the same frequency band;
a controller configured to:
control the pressure determiner and the transceiver, and operate the transceiver in an operating mode and in a sleeping mode, wherein an energy consumption of the transceiver is lower in the sleeping mode than in the operating mode, wherein the controller is configured to transfer the transceiver between sleeping mode and operating mode alternately based on a wake up cycle, the wake up cycle having a schedule during which the pressure module is configured to receive the information related to the instruction, wherein the controller is configured to base the schedule of the wake up cycle on a known or predicted state of movement of the vehicle, wherein the state of movement is favorable with respect to a localization measurement during a cornering or circular driving of the vehicle.

2. The pressure module of claim 1, wherein the transceiver is configured to wirelessly transmit and receive on different frequency carriers of the same frequency band.

3. The pressure module of claim 1, wherein the transceiver is configured to wirelessly transmit and receive on the same frequency carrier.

4. The pressure module of claim 1, wherein the controller is configured to:
   transfer the pressure determiner from sleeping mode to operating mode after the transceiver has wirelessly received the information related to the instruction to provide information related to the pressure of the tire, and
   transfer the pressure determiner into the sleeping mode after the information related to the pressure of the tire has been determined, and/or transfer the transceiver into the sleeping mode after the information related to the pressure of the tire has been transmitted.

5. The pressure module of claim 1, further comprising a sensor configured to determine the information related to the state of movement of the tire.

6. A transceiver module configured to communicate with a tire pressure module, comprising:
   a transceiver configured to:
      wirelessly transmit information related to an instruction to provide information related to a pressure of a tire to the tire pressure module;
      wirelessly receive the information related to the tire pressure from the tire pressure module;
      wirelessly transmit and receive in the same frequency band; wherein the transceiver is configured to wirelessly and repetitively transmit a trigger signal as information related to the instruction for a time period, which is based on a wake up cycle of the tire pressure module; and
      wirelessly and repetitively transmit a trigger signal as information related to the instruction for a time period, which is based on a wake up cycle of the tire pressure module, the wake up cycle having a schedule during which the pressure module is configured to receive the information related to the instruction, wherein the transceiver is configured to base the schedule of the wake up cycle on a known or predicted state of movement of the vehicle, wherein the state of movement is favorable with respect to a localization measurement during a cornering or circular driving of the vehicle.

7. The transceiver module of claim 6 further comprising an interface configured to:
   communicate with a control module,
   receive the information related to the instruction to provide the information related to the tire pressure from the control module, and
   provide the information related to the tire pressure to the control module.

8. A computer program having a program code on a non-transitory media for performing, when the computer program is executed on a computer or on a processor, a method for providing information related to a pressure of a tire in a vehicle, comprising:
   wirelessly receiving information related to an instruction to provide the information related to the pressure of the tire in a frequency band;
   determining the information related to the pressure of the tire;
   wirelessly transmitting the information related to the tire pressure in the frequency band;
   transferring between sleeping mode and operating mode alternately based on a wake up cycle, wherein an energy consumption of the pressure determiner and/or the transceiver is lower in the sleeping mode than in the operating mode; and
   transferring between sleeping mode and operating mode alternately based on a wake up cycle, wherein an energy consumption of a transceiver is lower in the sleeping mode than in the operating mode, the wake up cycle having a schedule during which the pressure module is configured to receive the information related to the instruction, wherein the schedule of the wake up cycle is based on a known or predicted state of movement of the vehicle, wherein the state of movement is favorable with respect to a localization measurement during a cornering or circular driving of the vehicle.

9. A computer program having a program code on a non-transitory media for performing, when the computer program is executed on a computer or on a processor, a method for communicating with a tire pressure module, comprising:
   wirelessly transmitting information related to an instruction to provide information related to a pressure of a tire to the tire pressure module in a frequency band;
   wirelessly receiving the information related to the tire pressure from the tire pressure module in the frequency band;
   wirelessly and repetitively transmitting a trigger signal as information related to the instruction for a time period, which is based on a schedule of the wake up cycle of the tire pressure module; and
   wirelessly and repetitively transmitting a trigger signal as information related to the instruction for a time period, which is based on the schedule of the wake up cycle of the tire pressure module, the wake up cycle having a schedule during which the pressure module is configured to receive the information related to the instruction, wherein the schedule of the wake up cycle is based on a known or predicted state of movement of the vehicle, wherein the state of movement is favorable with respect to a localization measurement during a cornering or circular driving of the vehicle.

10. The pressure module of claim 1, wherein the controller is configured to set the wake-up cycle longer if the state of movement indicates that the vehicle has been parked or switched off, than if the state of movement indicates the vehicle is operated or the wheels are in motion.

11. The pressure module of claim 1, wherein the controller is configured to trigger a pressure measurement of the tire if the state of movement indicates a stopping interval of the vehicle.

12. The pressure module of claim 1, wherein the controller is configured to base the schedule of the wake up cycle on a pressure measurement cycle and/or on a localization measurement cycle.

13. The pressure module of claim 1, wherein the state of movement is favorable with respect to a pressure measurement or a localization measurement.

14. The transceiver module of claim 6, wherein the transceiver is configured to base the schedule of the wake up cycle on a pressure measurement cycle and/or on a localization measurement cycle.

15. The transceiver module of claim 6, wherein the state of movement is favorable with respect to a pressure measurement or a localization measurement.

16. The transceiver module of claim 6, wherein the state of movement indicates a steering angle, a rotational rate or a directional movement of the vehicle.

17. The pressure module of claim 1, wherein the state of movement indicates a steering angle, a rotational rate or a directional movement of the vehicle.

* * * * *